US 6,633,838 B1

United States Patent
Arimilli et al.

(10) Patent No.: US 6,633,838 B1
(45) Date of Patent: Oct. 14, 2003

(54) MULTI-STATE LOGIC ANALYZER INTEGRAL TO A MICROPROCESSOR

(75) Inventors: Lakshminarayana Baba Arimilli, Austin, TX (US); Michael Stephen Floyd, Leander, TX (US); Larry Scott Leitner, Austin, TX (US); Kevin F. Reick, Austin, TX (US); Jennifer Lane Vargus, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,071

(22) Filed: Nov. 4, 1999

(51) Int. Cl.[7] .............................. G06F 11/25; G06F 9/44
(52) U.S. Cl. ............................ 703/16; 703/28; 714/39; 714/739
(58) Field of Search ........................ 703/28, 15, 16; 716/5; 714/30, 34, 39, 733, 739, 725; 702/117

(56) References Cited

U.S. PATENT DOCUMENTS

| | | | | |
|---|---|---|---|---|
| 5,425,036 A | * | 6/1995 | Liu et al. ...................... | 371/23 |
| 5,754,759 A | * | 5/1998 | Clarke et al. .......... | 395/183.13 |
| 5,771,240 A | * | 6/1998 | Tobin et al. ................ | 371/22.1 |
| 5,867,644 A | * | 2/1999 | Ranson et al. ......... | 395/183.15 |
| 5,960,191 A | * | 9/1999 | Sample et al. ......... | 395/500.49 |
| 6,286,114 B1 | * | 9/2001 | Veenstra et al. ............... | 714/39 |

* cited by examiner

Primary Examiner—Kevin J. Teska
Assistant Examiner—T. Phan
(74) Attorney, Agent, or Firm—Thomas E. Tyson; Edmond A. DeFrank

(57) ABSTRACT

The system and method of the present invention is embodied in a multi-state on-chip logic analyzer that is preferably integrated into a VLSI circuit. In general, the logic analyzer is preferably coupled to a multilevel trace array for storing event trace data generated by the logic analyzer. Input and output logic coupled to both the trace array and the logic analyzer allows reading or writing from or to the trace array, and programming of trigger and condition criteria for transitioning states within the logic analyzer. The logic analyzer has the capability match one or more programmable trigger events to satisfy one or more programmable conditions. Further, the logic analyzer preferably has the capability to initialize programmable conditions in desired states, and to store event trace data in an on-chip array for trace data reconstruction and analysis. Trace array input and output logic allows reading or writing from or to the trace array, and programming of trigger and condition criteria for transitioning states within the logic analyzer. Further, the trace array input and output logic is preferably accessible at both the wafer and component stage to allow for testing and debugging of the VLSI circuitry.

18 Claims, 6 Drawing Sheets

MULTI-STATE LOGIC ANALYZER INTEGRAL TO A MICROPROCESSOR

BACKGROUND OF THE INVENTION

1. Field of the Invention

The present invention generally relates to an on-chip logic circuit for debugging or analyzing microprocessor event trace data, and in particular to a multi-state on-chip logic analyzer having the capability count a programmable number of conditions before triggering and transitioning to the next state, and to store event trace data in an on-chip array for trace event reconstruction and analysis.

2. Description of the Related Art

VLSI circuits are becoming increasingly complex as the capability to construct more and more transistors, and thus logic elements, in smaller and smaller packages increases. As the complexity of VLSI circuits, such as, for example microprocessors and microcontrollers increases, the detection of internal circuit errors has become a priority. Consequently, several methods of testing and debugging VLSI circuits both at the wafer stage, and after component packaging have been implemented.

For example, external logic analyzers may be connected to the circuit under test to look for specific errors or sequences of events. These external logic analyzers are very proficient at capturing, storing, and analyzing microprocessor event trace data. Further, external logic analyzers can be programmed to trigger on specific error conditions, or to initiate specific events to examine VLSI circuit response. However, these external logic analyzers suffer from several problems. For example, external logic analyzers can be quite expensive. Further, because the sizes of VLSI circuits are continuously shrinking, simply connecting the external logic analyzer to the inputs and outputs of a VLSI circuit at the wafer stage, prior to component packaging, can be difficult. As a result, defective circuits may be packaged before an error that might render the circuit unusable can be detected. Further, because the external logic analyzer is by definition external to the VLSI circuit, capturing or monitoring of signals purely internal to the VLSI circuit may be difficult or impossible.

Other solutions, such as the use of oscilloscopes to measure electrical timing of the internal logic of VLSI circuits have also been implemented. Typically, oscilloscopes suffer from similar problems to those discussed for the external logic analyzers, namely expense, difficulty of connection at the wafer stage, and inability to monitor purely internal signals.

Still other solutions have used trace arrays within a VLSI circuit to capture event trace data. However, these circuits typically only have the ability to start or stop on a trigger event or condition. Consequently, such circuits are incapable of detecting multi-event error conditions. Further, such circuits do not have the ability to count events or to start or stop trace data capture at intermediate steps. Therefore, while such circuits are useful, their application is typically limited to testing for relatively simple error conditions.

Consequently, what is needed is a system and method for aiding in the debugging of VLSI circuits, at either the wafer or component stage, that does not require the use of external logic analyzers or oscilloscopes. This system should provide the capability to program multiple trigger events, and to initialize programmable conditions in desired states. Further, this system should provide the capability store event trace data for later reconstruction and analysis.

SUMMARY OF THE INVENTION

To overcome the limitations in the related art described above, and to overcome other limitations that will become apparent upon reading and understanding the present application, the present invention is embodied in a multi-state on-chip logic analyzer having the capability match one or more programmable trigger events to satisfy one or more programmable conditions, to initialize programmable conditions in desired states, and to store event trace data in an on-chip array for trace data reconstruction and analysis.

In general, the system and method of the present invention is embodied in a programmable multi-state logic analyzer integrated into a VLSI circuit. Further, the multi-state logic analyzer is coupled to a multilevel trace array for storing event trace data generated by the logic analyzer. Input and output logic coupled to both the trace array and the logic analyzer allows reading or writing from or to the trace array, and programming of condition or trigger criteria for transitioning states within the logic analyzer.

Specifically, the multi-state logic analyzer is preferably comprised of trace data control logic for generating triggers and controlling reads and writes to and from the trace array, and condition select logic for comparing conditions to programmable criteria to provide start, stop, run-n, stop-n, or reset commands to the trace data control logic. In other words, when a condition, or sequence of conditions, is either seen or met, writing to the trace array is preferably started, stopped, run for a programmable number of cycles, or stopped after a programmable number of cycles depending upon the programming of the condition select logic. Further, a reset command preferably allows the trace data control logic and the condition select logic to be reset to an initial state.

The trace data control logic preferably controls the running state of the trace array and generates triggers based on comparisons to programmable trigger criteria. The conditions that cause the condition select logic to transition from one state to the next are preferably programmable and are based on signals entering the trace data control logic from various logic units within the VLSI circuit to generate triggers. A plurality of programmable conditions are preferably met or enabled by one or more associated programmable trigger masks. Conditions are preferable met by a single trigger event.

Alternatively, in one embodiment, conditions are preferably met by counting a plurality of programmable trigger events to satisfy a single condition. In this embodiment, a bit-wise logical OR of the triggers for a given condition is preferably performed to form a trigger count input. When a trigger count matches a programmed trigger count value, the condition is preferably considered met. In other words, when one or more unique trigger events are seen a specified number of times, the condition is considered met.

In general, when a condition is considered met, either in the case of a single trigger condition, or where multiple triggers are used to define a condition, the condition select logic preferably transitions to a subsequent state, and either no command, or a start, stop, run-n, stop-n, or reset command is provided to the trace data control logic depending upon the programming of the condition select logic. Consequently, when a predefined condition is met, the trigger events causing the condition to be met are preferably written to the trace array, at which time, writing to the trace array continues, stops, runs for a programmable period, or stops after a programmable period depending upon the state and programming of the condition select logic.

Specifically, the condition select logic preferably begins in an initial state, however, the condition select logic is preferably programmable such that the condition select logic may begin in an intermediate state or condition. Writing of trigger event data to the trace array preferably begins with the first condition met, but may begin after any of the programmable conditions.

If after meeting one or more conditions, a subsequent condition is not met after a preferably programmable period of time, the condition select logic will preferably time out and transition back to an initial or intermediate condition at which time writing to the trace array is preferably stopped. However, if the subsequent condition is met, a final condition state is preferably entered for one cycle to generate a signal to the trace data control logic to complete writing of the trigger event data causing the final state to be entered.

In this fashion, a complete picture of the error conditions generating trigger events is captured and stored in the trace array. Once the final condition has been active for one clock cycle, the condition select logic preferably resets to an initial or intermediate state, depending upon the programming, to await the next set of trigger events. Trace array input and output logic allows reading or writing from or to the trace array, and programming of trigger and condition criteria for transitioning states within the logic analyzer. Further, the trace array input and output logic is preferably accessible at both the wafer and component stage to allow for testing and debugging of the VLSI circuitry.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The system and method of the present invention is embodied in a multi-state on-chip logic analyzer that is preferably integrated into a VLSI circuit. In general, the logic analyzer is preferably coupled to a multilevel trace array for storing event trace data generated by the logic analyzer. Input and output logic coupled to both the trace array and the logic analyzer allows reading or writing from or to the trace array, and programming of trigger and condition criteria for transitioning states within the logic analyzer. The logic analyzer has the capability match one or more programmable trigger events to satisfy one or more programmable conditions. Further, the logic analyzer preferably has the capability to initialize programmable conditions in desired states, and to store event trace data in an on-chip array for trace data reconstruction and analysis. Trace array input and output logic preferably allows reading or writing from or to the trace array, and programming of trigger and condition criteria for transitioning states within the logic analyzer. Further, the trace array input and output logic is preferably accessible at both the wafer and component stage to allow for testing and debugging of the VLSI circuitry.

System Overview

Figure 1:
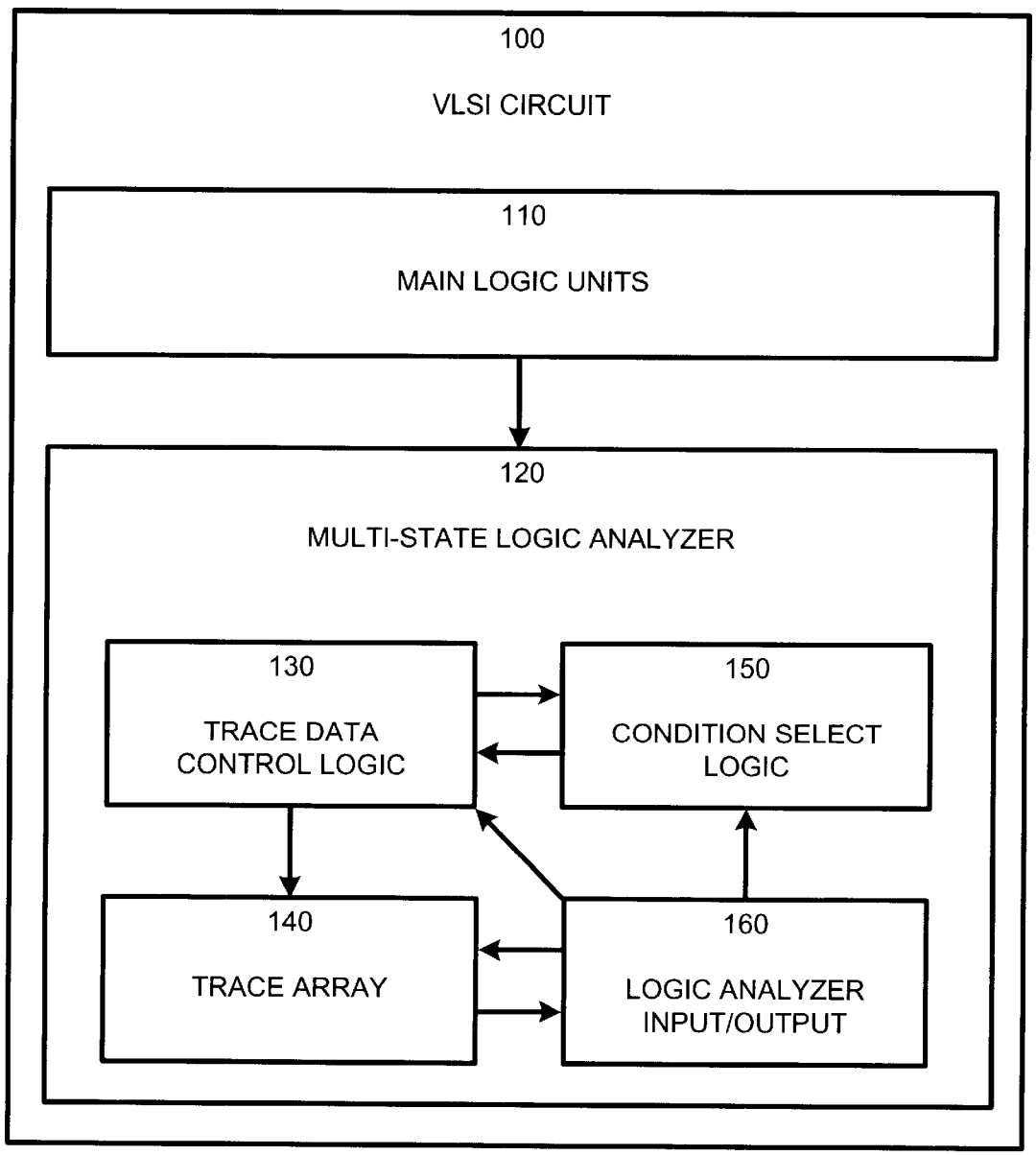
FIG. 1 is a general block diagram illustrating a multi-state logic analyzer integrated into a VLSI circuit in accordance with the present invention.

FIG. 1 is a general block diagram illustrating a multi-state logic analyzer integrated into a logic circuit, such as, for example, a VLSI circuit. The VLSI circuit 100 of FIG. 1 is composed of a plurality of logic units 110. In addition to performing their primary intended functions, these logic units 110, may also be used to provide inputs to a multi-state logic analyzer 120 according to the present invention. The multi-state logic analyzer 120 is preferably comprised of trace data control logic 130 for generating triggers and controlling reads and writes to and from a trace array 140, and condition select logic 150 for comparing conditions to programmable criteria to provide start, stop, run-n, stop-n, or reset commands to the trace data control logic. In other words, when a condition, or sequence of conditions, is either seen or met, writing to the trace array 140 is preferably started, stopped, run for a programmable number of cycles, or stopped after a programmable number of cycles depending upon the programming of the condition select logic 150.

Further, the reset command preferably allows the trace data control logic 130 and the condition select logic 150 to be reset to an initial state. In addition, logic analyzer input and output logic 160 is coupled to the trace array, the trace data control logic 130, and the condition select logic 150. The input and output logic 160 allows reading or writing from or to the trace array 140, and programming of trigger and condition criteria for transitioning states within the logic analyzer 120. The trace data control logic 130 preferably controls the state of the trace array 140 and generates triggers based on comparisons to programmable trigger criteria. Also, it should be noted that triggers may be obtained from several other sources, including triggers generated directly by logic units within the VLSI circuit, specific errors within the VLSI circuit, or any combination of triggers via a bit-wise logical AND of individual triggers.

Operation

Figure 2:
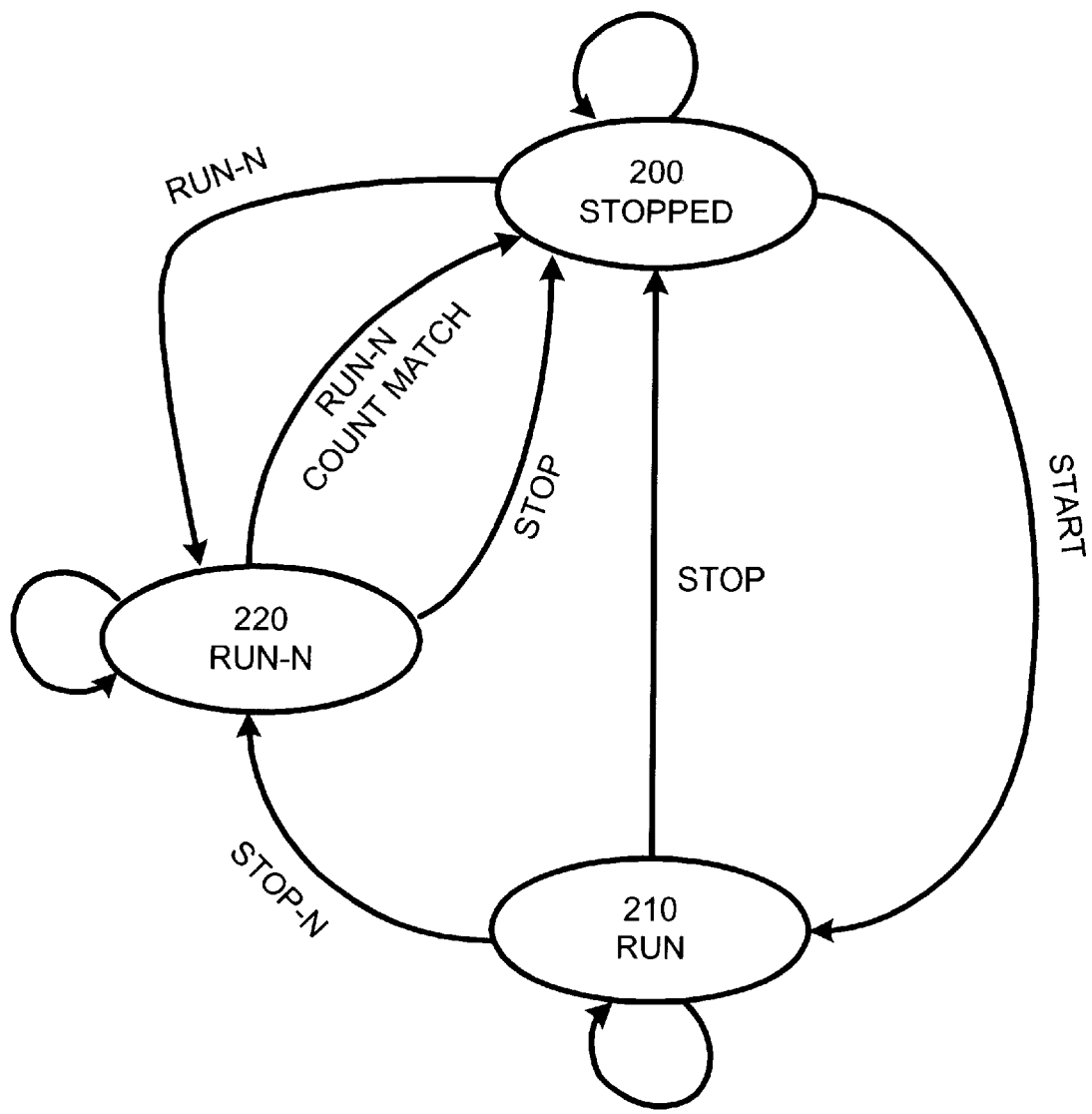
FIG. 2 is a general state diagram illustrating the preferred operation of the trace data control logic of FIG. 1.

Referring to FIG. 2 in combination with FIG. 1, FIG. 2 is a general state diagram illustrating the preferred operation of the trace data control logic 130 of FIG. 1 in controlling the trace array 140 of FIG. 1. The state diagram of FIG. 2 shows that in the initial state 200, the writing of data to the trace array 140 is preferably stopped. From this initial state 200, the trace data control logic 130 can order the trace array 140 to either start, or to run for a certain number of cycles.

When the trace array 140 is ordered started from the initial state 200, the trace array preferably transitions to the Run state 210, where it preferably continues to run until another order is received. When the trace array 140 is ordered to run for a certain number of cycles, from the initial state 200, the 20trace array preferably transitions to the Run-N state 220. In the Rui-N state 220, the trace array 140 will preferably run for a programmable number of cycles (N), then it will preferably transition back to the initial state 200 where the trace array will be stopped. Further, at any time while the trace array 140 is in the Run-N state 220, the trace array may be ordered stopped, at which time it will transition to the initial state 200 and stop.

From the Run state 210, the trace array 140 can either be ordered stopped, or to run a certain number of cycles. When the trace array 140 is ordered stopped from the Run state 210, the trace array preferably transitions to the initial state 200 where it stops running. When the trace array 140 is ordered to run a certain number of cycles from the run state, the trace array preferably transitions to the Run-N state 220. As before, the trace array 140 will then preferably run for the specified number of cycles, then transition to the initial state 200 where it will stop. As noted above, at any time while the trace array is in the Run-N state, the trace array 140 may be ordered stopped, at which time it will transition to the initial state 200 and stop.

In general, as shown in FIG. 1, the condition select logic 150 determines whether a plurality of programmable conditions have been satisfied by at least one trigger event generated by the trace data control logic 130. The trigger events are preferably programmable and are generated based on signals entering the trace data control logic 130 from various logic units within the VLSI circuit 100. As each of the conditions is satisfied, the condition select logic 150 preferably transitions from one state to the next. Conditions are preferably met by a single programmable trigger, by any one of a plurality of unique programmable triggers, by multiple counts of a single programmable trigger, or by multiple counts of any one of a plurality of unique triggers. Each of the conditions of interest in the condition select logic may be unique, or may, for example, simply be different counts of the same trigger, depending upon what has been programmed into the condition select logic 150.

Figure 3:
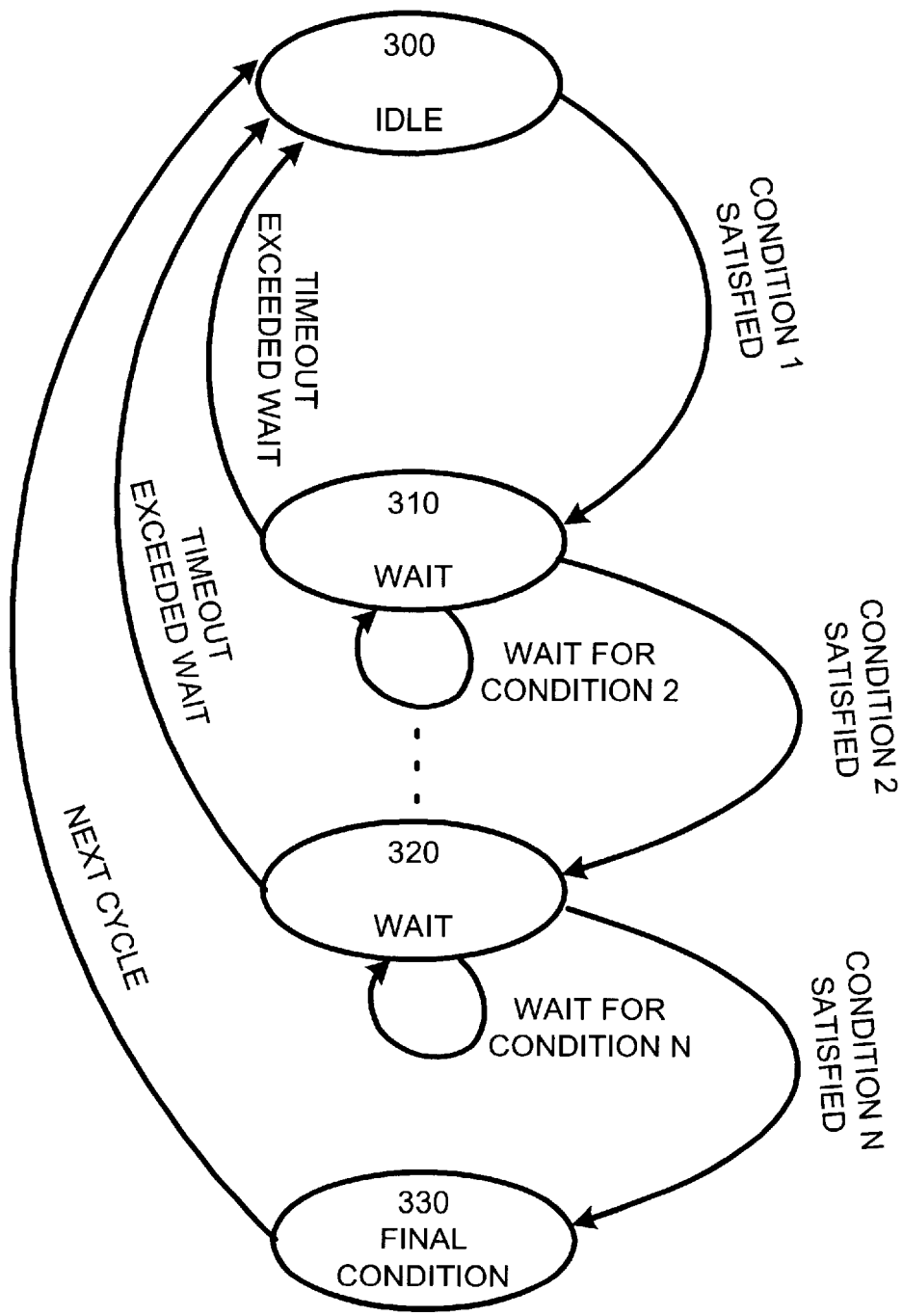
FIG. 3 is a general state diagram illustrating the preferred operation of the condition select logic of FIG. 1.

Referring to FIG. 3 in combination with FIG. 1, FIG. 3 is a general state diagram illustrating the preferred operation of the condition select logic 150. Thus, FIG. 3 shows that the condition select logic is preferably in an idle state 300 while waiting for a first condition to be satisfied. Once the first condition is satisfied, the trace data control logic 130 either does not change the state of the trace array 140, or orders the trace array to start, run, run for a certain number of cycles, or stop as described above, depending upon the programming of the trace data control logic. Further, once the first condition is satisfied, the condition select logic 150 preferably transitions to a first wait state 310. The condition select logic 150 then preferably waits for a second condition to be satisfied. The programmability of the condition select logic 150 preferably provides an option to specify the wait period in each wait state. Further, in some cases, it is desirable to have an infinite wait period while waiting for the second condition or subsequent conditions. The programmability of the condition select logic 150 preferably also allows for this possibility.

If the second condition is not satisfied within the specified wait period, the condition select logic 150 preferably transitions back to the idle state 300 and again either does not change the state of the trace array 140, or orders the trace array to start, run, or stop as described above, depending upon the programming of the trace data control logic. If the second condition is satisfied within the wait period, the condition select logic 150 preferably transitions to a next wait state 320, and again waits for the programmed condition to be satisfied. As before, if the condition is not satisfied during the wait period, the condition select logic 150 preferably transitions back to the idle state 300.

This process of waiting until conditions are met, or timing out if conditions are not met within a certain period of time, then either not changing the state of the trace array, or ordering the trace array to start, stop, or run for a certain number of cycles, and transitioning the state of the condition select logic, preferably continues through a desired number of states until a final condition is satisfied to transition the condition select logic 150 to a final condition state 330. At this time, a one cycle pulse is preferably generated by the condition select logic 150 to signal the trace data control logic 130 to complete writing of the trigger event data causing the final condition state 330 to be entered. In this fashion, a complete picture of the trace data that caused the triggers to be generated is captured and stored in the trace array 140. Once the final condition has been active for one clock cycle, the condition select logic 150 preferably resets to an initial or intermediate state, depending upon the programming, to await the next set of trigger events.

Working Example

The following description is for illustrative purposes only and describes one method of generating triggers for the on-chip multi-state logic analyzer, and two methods of determining whether individual conditions have been met or satisfied in accordance with the present invention.

Figure 4:
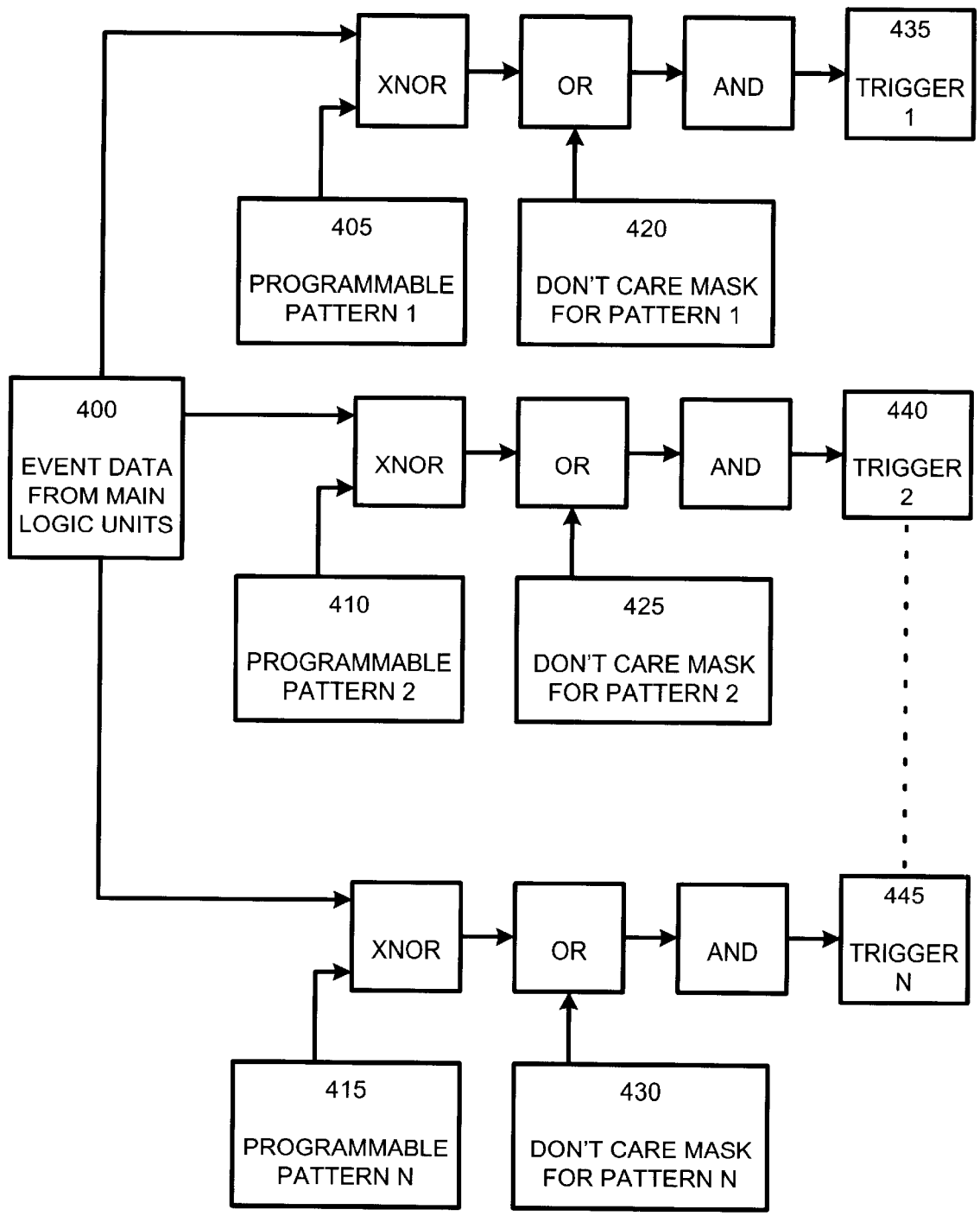
FIG. 4 is a general functional diagram illustrating a system for generating trigger events in accordance with the present invention.

Thus, an exemplary logic analyzer in accordance with the present invention, will preferably generate a plurality of triggers as illustrated in FIG. 4. Specifically, event data from a variety of VLSI logic circuits is compared to at least one programmable pattern 405, 410 or 415, by a bit-wise logical XNOR of the event data and the pattern. The result of each bit-wise logical XNOR operation is then filtered through a programmable don t care mask, 420, 425, or 430, to exclude bits which are not of interest, by performing a bit-wise logical OR operation between the results of the XNOR operation and the don t care mask. The bits resulting from the bit-wise logical OR operation are then passed through a bit-wise logical AND so that if all bits are 1, the logical AND will generate a 1, thereby producing a trigger, 435, 440, or 445. Any other combination of bits will preferably not generate a trigger.

Figure 5:
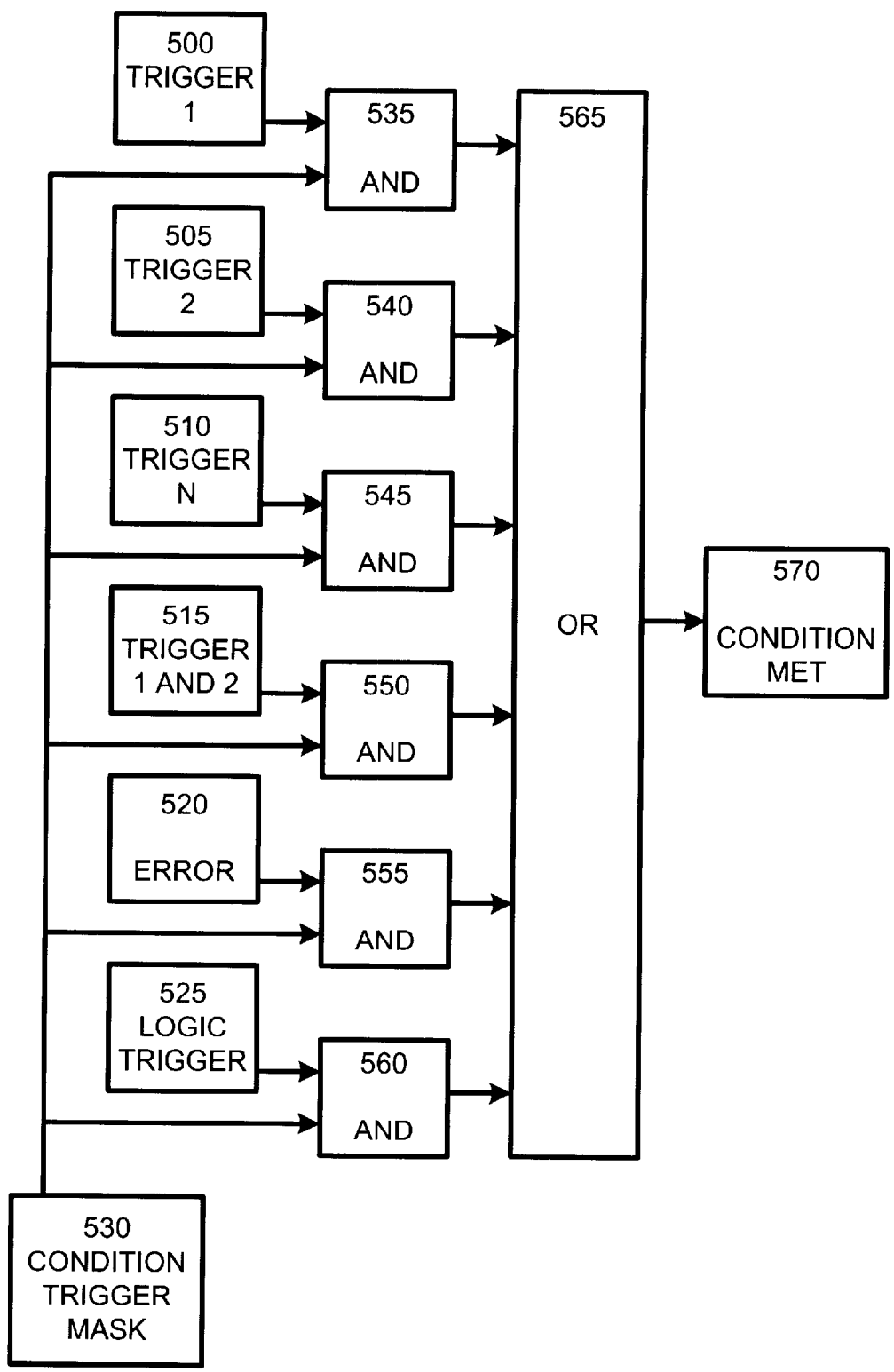
FIG. 5 is a general functional diagram illustrating a system for determining whether a trigger satisfies a specific condition in accordance with the present invention.

As discussed above, the condition select logic 150 (as shown in FIG. 1) preferably determines whether a plurality of programmable conditions have been satisfied by at least one trigger event generated by the trace data control logic 130 (as shown in FIG. 1) as described above. As illustrated in FIG. 5, conditions are preferably met by comparing each one of a plurality of triggers, 500, 505, 510, 515, 520, or 525, to a condition trigger mask 530 by a bit-wise logical AND, 535, 540, 545, 550, 555, or 560. The results of each logical AND operation are then passed through a bit-wise logical OR 565, so that if any trigger matches the condition trigger mask 530, the condition will be met 570. It should be noted that triggers may be obtained from several sources, including triggers generated directly by logic units within the VLSI circuit 525, specific errors within the VLSI circuit 520, or any combination of triggers via a bit-wise logical AND of individual triggers 515.

Figure 6:
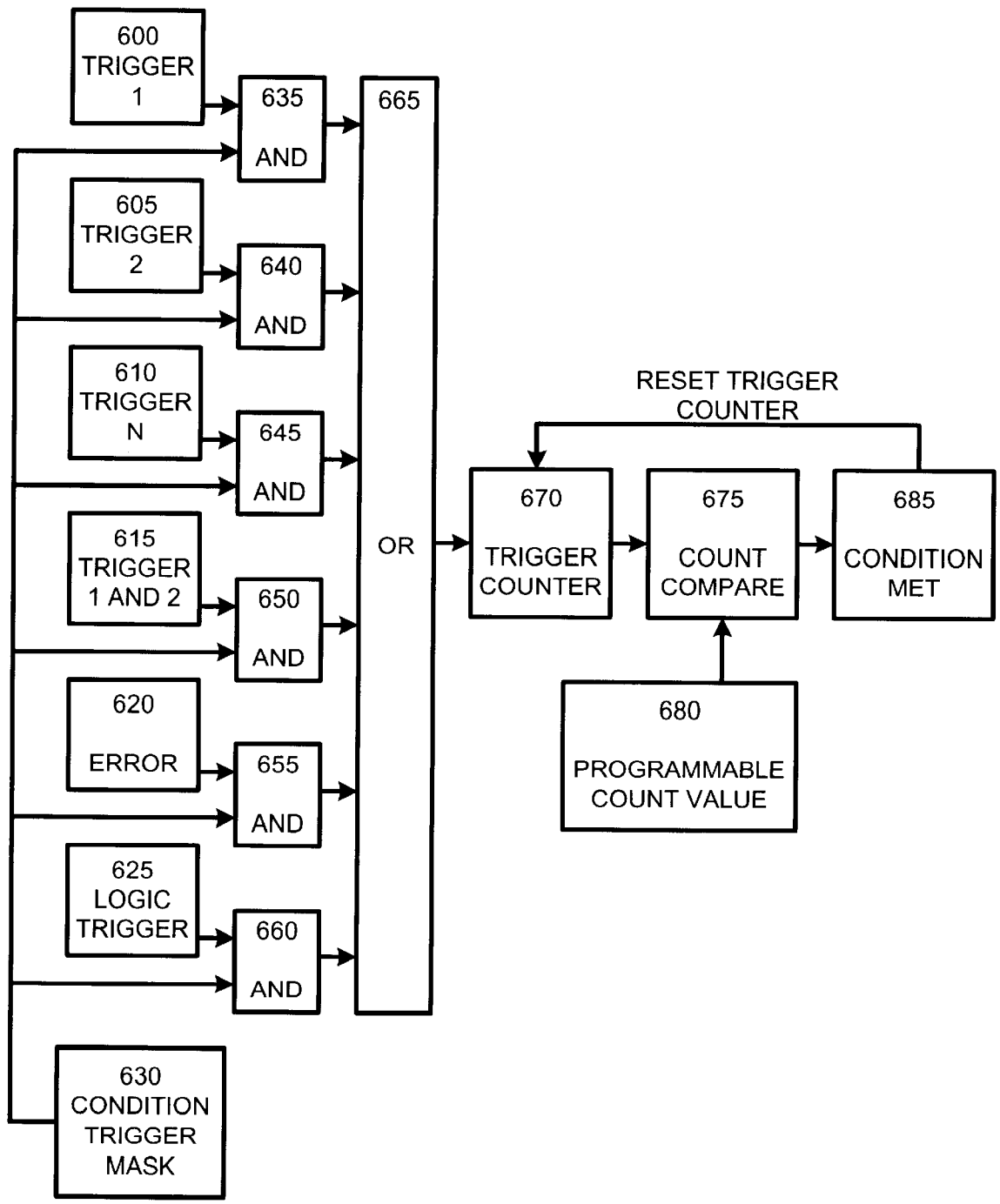
FIG. 6 is a general functional diagram illustrating a system for determining whether a programmable count of triggers satisfy a specific condition in accordance with the present invention.

In an alternate embodiment of the condition select logic 150 (as shown in FIG. 1), as illustrated in FIG. 6, conditions are preferably met by multiple counts of a single programmable trigger, or by multiple counts of any one of a plurality of programmable triggers. As illustrated in FIG. 6, conditions are preferably met by comparing each one of a plurality of triggers, 600, 605, 610, 615, 620, or 625, to a condition trigger mask 630 by a bit-wise logical AND, 635, 640, 645, 650, 655, or 660. The results of each logical AND operation are then passed through a bit-wise logical OR 665, so that if any trigger matches the condition trigger mask 630, the trigger count will be incremented by a trigger counter 670. As the trigger counter 670 is incremented, the count is compared 675 to a programmable count value 680. When a the number of triggers reaches the programmed value, the condition will be met 685.

As discussed above, and referring back to FIG. 1, once a condition is met, in either the single trigger or multi-trigger embodiment, the condition select logic 150 preferably transitions state, and the trace data control logic 130 preferably either does not change the state of the trace array 140, or provides start, stop, run-n, stop-n, or reset commands to the trace data control logic depending upon the programming of the condition select logic.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for storing event data in an array integrated into a microprocessor, comprising:
   matching at least one programmable trigger event to logic circuit event data in a logic analyzer integrated into the microprocessor;
   counting a plurality of programmable trigger events;
   storing the event data in the array in response to at least one match of the at least one programmable trigger event; and
   defining a temporal relationship between trigger events to transition a state of the logic analyzer to at least a previous state when at least one programmable trigger event has not been matched within a programmable period of time.

2. The method of claim 1 wherein storing the event data in the array may be started, run for a programmable number of cycles, stopped after a programmable number of cycles, and stopped at any time by the logic analyzer in response to the at least one match of the at least one programmable trigger event.

3. The method of claim 1 wherein the array may be reset to a default state in response to the at least one match of the at least one programmable trigger event.

4. The method of claim 1 wherein the at least one match of the at least one programmable trigger event defines at least one programmable condition.

5. The method of claim 4 wherein the state of the logic analyzer is defined by matching at least one programmable condition.

6. The method of claim 5 wherein the storing of event data in the array is controlled by the state of the logic analyzer.

7. The method of claim 5 wherein the state of the logic analyzer transitions to a next state following the matching of the at least one programmable condition.

8. The method of claim 5 wherein the state of the logic analyzer transitions to at least one previous state when at least one programmable condition has not been matched within a programmable period of time.

9. The method of claim 5 wherein the state of the logic analyzer transitions to at least one previous state when a final condition is matched.

10. The method of claim 4 wherein conditions are defined by matching a plurality of unique trigger events.

11. The method of claim 1 further comprising programming trigger events and conditions in the logic analyzer via logic analyzer input logic circuitry.

12. The method of claim 1 further comprising reading the data in the array via logic analyzer output logic circuitry.

13. A method for analyzing signals internal to a VLSI circuit comprising:
   integrating a logic analyzer into the circuitry of the VLSI circuit;
   matching at least one programmable trigger event to logic circuit event data in the logic analyzer;
   counting a plurality of programmable trigger events;
   storing the event data in response to at least one match of the at least one programmable trigger event, wherein each match defines at least one programmable condition;
   defining a plurality of sequential states of the logic analyzer by matching at least one programmable condition with each state; and
   transitioning the state of the logic analyzer to at least one previous state when at least one programmable condition has not been matched within a programmable period of time.

14. The method of claim 13 wherein the logic analyzer has the capability count a plurality of programmable trigger events before matching the at least one programmable condition.

15. The method of claim 13 wherein the event data is stored in an array integral to the logic analyzer.

16. A microchip containing a plurality of logic circuits having an integral logic analyzer comprising:
   programmable trace data control logic for controlling writing of event data to a trace array;
   programmable condition select logic coupled to the trace data control logic for controlling the trace data control logic in response to at least one match of at least one programmable condition and for changing logic transitions from an initial state to at least one subsequent state in response to the at least one match of the at least one programmable condition; and
   input and output logic coupled to the trace data control logic, the trace array, and the condition select logic, wherein the condition select logic transitions from one of the at least one subsequent states to at least one previous state if the at least one match of the at least one programmable condition does not occur within a programmable period of time.

17. The input and output logic of claim 16 wherein programming the trace data control logic, reading the trace array and programming the at least one condition is performed via the input and output logic.

18. The logic analyzer of claim 16 wherein the condition select logic, in response to the state of the condition select logic, orders the trace data control logic to perform one of:

writing of event data to the trace array;

writing of event data to the trace array for a programmable number of cycles;

stopping the writing of event data to the trace array after a programmable number of cycles;

stopping the writing of event data to the trace array at any time; and resetting the trace array.

* * * * *